(12) United States Patent
Jain et al.

(10) Patent No.: US 9,736,704 B1
(45) Date of Patent: Aug. 15, 2017

(54) PROVIDING AN OVERLAY NETWORK USING MULTIPLE UNDERLYING NETWORKS

(71) Applicant: Google Inc., Mountain View, CA (US)

(72) Inventors: Arvind Jain, Los Altos, CA (US);
Nicholas Charles Fox, San Francisco, CA (US)

(73) Assignee: Google Inc., Mountain View, CA (US)

( * ) Notice: Subject to any disclaimer, the term of this patent is extended or adjusted under 35 U.S.C. 154(b) by 105 days.

(21) Appl. No.: 14/139,481

(22) Filed: Dec. 23, 2013

(51) Int. Cl.
*H04W 48/18* (2009.01)
*H04W 24/02* (2009.01)
*H04W 28/16* (2009.01)

(52) U.S. Cl.
CPC .......... *H04W 24/02* (2013.01); *H04W 28/16* (2013.01)

(58) Field of Classification Search
USPC ........................................................ 370/252
See application file for complete search history.

(56) References Cited

U.S. PATENT DOCUMENTS

| | | | |
|---|---|---|---|
| 6,128,490 A | 10/2000 | Shaheen et al. | |
| 6,633,761 B1 | 10/2003 | Singhal et al. | |
| 7,509,131 B2 | 3/2009 | Krumm et al. | |
| 7,848,292 B2 | 12/2010 | Bl et al. | |
| 8,131,317 B2 | 3/2012 | Lee | |
| 8,155,081 B1 | 4/2012 | Mater et al. | |
| 8,165,581 B2 | 4/2012 | Joshi et al. | |
| 8,200,217 B2 | 6/2012 | Kanade et al. | |
| 8,385,267 B2 * | 2/2013 | Wu | H04L 67/1065 370/328 |
| 8,477,645 B2 | 7/2013 | Scherzer et al. | |

(Continued)

FOREIGN PATENT DOCUMENTS

WO   WO 2013/020598 A1   2/2013
WO   WO 2013/044359 A1   4/2013

OTHER PUBLICATIONS

Gemalto N.V. "Card ADMIN," Document Reference D1225357A (Jun. 2, 2011).

(Continued)

*Primary Examiner* — Omar Ghowrwal
*Assistant Examiner* — Angel Brockman
(74) *Attorney, Agent, or Firm* — Troutman Sanders LLP; James E. Schutz; Brennan M. Carmody

(57) ABSTRACT

A system and method for providing an overlay network is provided. The overlay network comprises a database of underlying wireless networks provided by various carriers. Location information, an associated time and wireless network performance parameters of a plurality of wireless networks are collected from a plurality of client devices. The system and method aggregates the performance parameters based on geographic area and a time window. The performance parameters are analyzed to determine a best performing wireless network within each geographic area during the time window. The best performing wireless network is then assigned as a default wireless network for the geographic area during the time window and stored in the database defining the overlay network. The database is then provided to the plurality of client devices to provide a default wireless network for the plurality of client device to attach to when in that geographic area during the time window.

20 Claims, 9 Drawing Sheets

(56) References Cited

U.S. PATENT DOCUMENTS

| | | | |
|---|---|---|---|
| 8,542,637 | B2 | 9/2013 | Bandhakavi et al. |
| 8,565,766 | B2 | 10/2013 | Scherzer et al. |
| 8,938,258 | B2* | 1/2015 | Fix .................... G01S 5/0252 |
| | | | 342/353 |
| 2005/0245269 | A1 | 11/2005 | Demirhan et al. |
| 2006/0098625 | A1 | 5/2006 | King et al. |
| 2006/0193295 | A1 | 8/2006 | White et al. |
| 2007/0037550 | A1 | 2/2007 | Rassam |
| 2007/0064684 | A1 | 3/2007 | Kottilingal |
| 2007/0064894 | A1 | 3/2007 | Armstrong et al. |
| 2007/0127391 | A1 | 6/2007 | Goodman |
| 2008/0002668 | A1 | 1/2008 | Asokan et al. |
| 2008/0233977 | A1 | 9/2008 | Xu et al. |
| 2009/0161626 | A1* | 6/2009 | Crawford ............ H04W 36/14 |
| | | | 370/331 |
| 2009/0168757 | A1 | 7/2009 | Bush |
| 2009/0310501 | A1* | 12/2009 | Catovic ............... H04W 24/08 |
| | | | 370/252 |
| 2010/0172323 | A1 | 7/2010 | Rexhepi et al. |
| 2011/0078106 | A1* | 3/2011 | Luchi ................ G06F 11/3452 |
| | | | 706/48 |
| 2011/0096673 | A1 | 4/2011 | Stevenson et al. |
| 2011/0216694 | A1 | 9/2011 | Plasberg et al. |
| 2011/0269423 | A1 | 11/2011 | Schell et al. |
| 2012/0108206 | A1 | 5/2012 | Haggerty |
| 2012/0178488 | A1 | 7/2012 | Jonker et al. |
| 2013/0165117 | A1 | 6/2013 | Narayanan |
| 2013/0225169 | A1 | 8/2013 | Farnsworth et al. |
| 2013/0227647 | A1 | 8/2013 | Thomas et al. |
| 2013/0230023 | A1 | 9/2013 | Gray et al. |
| 2013/0303156 | A1 | 11/2013 | Astrom et al. |
| 2014/0071895 | A1 | 3/2014 | Bane et al. |
| 2014/0080539 | A1 | 3/2014 | Scherzer et al. |
| 2014/0127992 | A1 | 5/2014 | Kuscher et al. |
| 2014/0148100 | A1 | 5/2014 | Kim et al. |
| 2014/0148170 | A1 | 5/2014 | Damji et al. |
| 2014/0211648 | A1 | 7/2014 | Rahmati et al. |
| 2014/0213256 | A1 | 7/2014 | Meylan et al. |
| 2015/0049630 | A1* | 2/2015 | Kritt .................... H04W 24/08 |
| | | | 370/254 |

OTHER PUBLICATIONS

Dicoda.com. "Multi IMSI," Dicoda.com (Jun. 20, 2013) (available at: https://web.archive.org/web/20130620191315/http://www.dicoda.com/introduction/imsi).

Higginbotham, Stacey. "Is Apple About to Cut Out the Carriers?" Gigaom.com (Oct. 27, 2010) (available at: http://gigaom.com/2010/10/27/is-apple-about-to-cut-out-the-carriers/).

Tobias, Marc Weber. "The Split Personality Cell Phone That Saves You Money on Overseas Calling," Forbes.com (Aug. 20, 2013) (available at: http://onforb.es/14gMCe4).

"Circuit-switched fallback. The first phase of voice evolution for mobile LTE devices." Qualcomm Incorporated, 2012 11 pages.

CMSG. "Reprogrammable SIMs: Technology, Evolution and Implications," Final Report (Sep. 25, 2012) (available at: http://stakeholders.ofcom.org.uk/binaries/research/telecoms-research/reprogrammable-sims.pdf).

"Feature Requests—Republic Wireless Wiki," http://republic-wireless.wikia.com/wiki/Feature_Requests 1 page.

"Republic Wireless," http://republicwireless.com 2 pages.

"T-Mobile's 4G Network—Check Your Coverage—T-Mobile Blazing Fast 4G Coverage" 9 pages.

"What is VoLTE | Voice Over LTE | Tutorial," Radio-Electronics.com, http://www.radio-electronics.com/info/cellulartelecomms/lte-long-term-evolution/voice-over-lte-volte.php 5 pages.

Ge et al., "A History-Based Handover Prediction for LTE Systems" Computer Network and Multimedia Technology. CNMT. International Symposium on , vol., No., pp. 1,4, 18-20 (Jan. 2009).

Korean Intellectual Property Office, International Search Report and the Written Opinion in International Application No. PCT/US2014/057709 Dec. 29, 2014.

* cited by examiner

PROVIDING AN OVERLAY NETWORK USING MULTIPLE UNDERLYING NETWORKS

BACKGROUND OF THE INVENTION

Wireless networks do not provide perfect coverage for a variety of reasons, such as poor signal propagation or congestion over the network. Accordingly, a client device connected to a single wireless network will not be able to maintain a consistent level of coverage over all locations throughout the course of a day. As coverage for a wireless network decreases, a client device connected to that particular wireless network will search for other available networks in order to maintain a preferred level of service. In many situations, the client device will have a plurality of wireless networks available. However, during the process of deciding on which wireless network to attach to, the client device may first attempt to attach to several different networks prior to settling on a single wireless network that provides the sought after level of service. Because the client device does not know which wireless network to attach to, the process of attaching or attempting to attach to several wireless networks prior to settling on a single wireless network is inefficient.

BRIEF SUMMARY OF THE INVENTION

One embodiment provides a method of providing an overlay wireless network. The method includes receiving location information and wireless network performance parameters from a plurality of client devices, the wireless network performance parameters characterize network performance of wireless networks available to the plurality of client devices; associating the received location information and the received wireless network performance parameters with a timestamp; aggregating the received wireless network performance parameters based on the received location information and the associated timestamp for each of the wireless networks available to the plurality of client devices; quantizing the wireless network performance parameters to a plurality of geographic areas based on the associated location information and to an at least one time window within each of the plurality of geographic areas based on the associated timestamp; analyzing the quantized wireless network performance parameters to determine a default wireless network within each of the plurality of geographic areas and the at least one time window; building a database searchable based on the plurality of geographic areas and the at least one time window within each of the plurality of geographic areas; and assigning the determined default wireless network within each of the plurality of geographic areas and the at least one time window.

Another embodiment includes a system of providing an overlay network. The system includes a plurality of client devices, and each individual client device of the plurality of client devices configured to determine location information of the individual client device; collect wireless network performance parameters from wireless networks available to the individual client device; and upload the wireless network performance parameters and the location information to a service hosting a database defining the overlay network, the database is configured to be searchable based on a geographic area during a time window specifying a period of time in the geographic area. The system further includes a server running the service, the server configured to receive the wireless network performance parameters and the location information uploaded by the individual client device; associate a timestamp with the wireless network performance parameters and the associated location information uploaded from the individual client device; aggregate the wireless network performance parameters based on the location information and the associated timestamp; quantize the aggregated wireless network performance parameters into the geographic area during the time window; analyze the wireless network performance parameters to determine a default wireless network within the geographic area during the time window; and assign the default wireless network to the database at the geographic area during the time window.

Yet another embodiment includes a non-transitory computer readable storage device for providing an overlay network. The computer readable storage device having computer executable instructions for performing the steps of receiving location information and wireless network performance parameters from a plurality of client devices, the wireless network performance parameters characterize network performance of wireless networks available to the plurality of client devices; associating the received location information and the received wireless network performance parameters with a timestamp; aggregating the received location information, the received wireless network performance parameters and the associated timestamp such that the received wireless network performance parameters are associated with the received location information and the associated timestamp for each of the wireless networks available to the plurality of client devices; quantizing the wireless network performance parameters to a plurality of geographic areas based on the associated location information and to an at least one time, window within each of the plurality of geographic areas, based on the associated timestamp; analyzing the quantized wireless network performance parameters to determine a default wireless network within each of the plurality of geographic areas and the at least one time window; building a searchable database based on the plurality of geographic areas and the at least one time window within each of the plurality of geographic areas; and assigning the determined default wireless network within each of the plurality of geographic areas and the at least one time window.

DETAILED DESCRIPTION OF THE INVENTION

Wireless networks do not provide perfect coverage for a variety of reasons, such as poor signal propagation or congestion over the network. Accordingly, a client device connected to a single wireless network will not be able to maintain a consistent level of coverage over all locations throughout the course of a day. As coverage for a wireless network decreases, a client device connected to that particular wireless network will search for other available networks in order to maintain a preferred level of service. In many situations, the client device will have a plurality of wireless networks available. However, during the process of deciding on which wireless network to attach to, the client device may first attempt to attach to several different networks prior to settling on a single wireless network that provides the sought after level of service. Because the client device does not know which wireless network to attach to, the process of attaching or attempting to attach to several wireless networks prior to settling on a single wireless network is inefficient.

Therefore, to improve selection efficiency for wireless networks, an overlay network can be provided. The overlay network is defined by a database of preferred or default wireless networks available to a client device in certain geographic areas and at certain times. As mentioned above, because an individual wireless network does not provide perfect coverage, the overlay network will make use of any available wireless networks. In this manner, even though a single wireless network may have poor coverage in a geographic area at a certain time, another wireless network may have better coverage and be less congested during that period of time. The overlay network would take into account historical performance of the various wireless networks within the relevant area and at the relevant time to determine which wireless network will, on average, provide the best coverage. The wireless network that is determined to provide the best coverage in that geographic area during a specified time window is then assigned as the default wireless network in the database defining the overlay network. The database is then shared with a client device within the geographic area and at a certain time within the time window such that the client device attaches to the default network without first having to scan and assess the various other available wireless networks.

Figure 1:
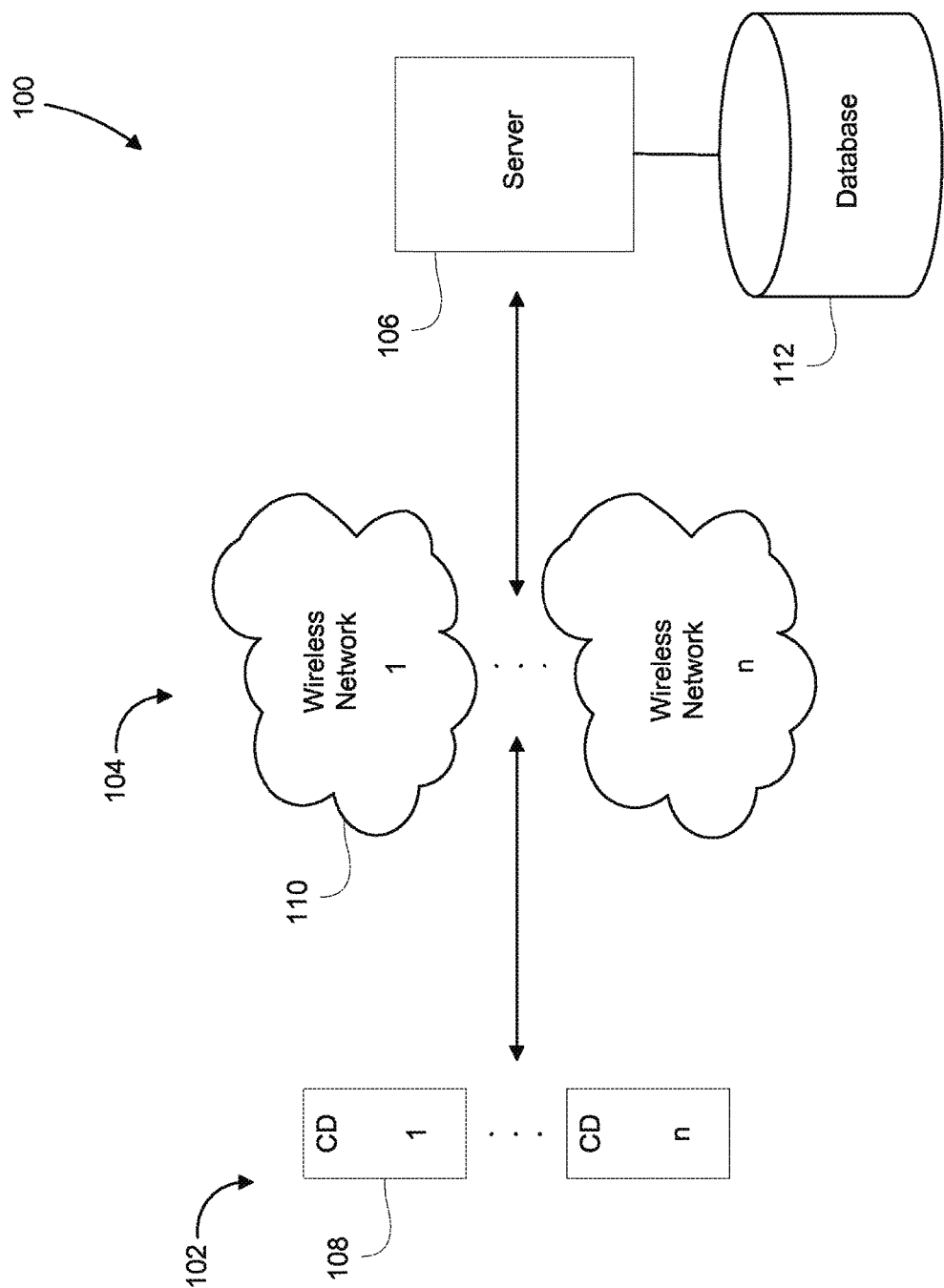
FIG. 1 is a block diagram illustrating a system for providing an overlay network, according to an example embodiment.

FIG. 1 illustrates a block diagram of an example communications system 100 in which various embodiments of the present disclosure may be implemented. In the communications system 100 depicted in FIG. 1, a plurality of client devices 1-n 102 are shown in relation to a plurality of wireless networks 1-n 104, which in turn are shown in relation to a server 106 and a database 112.

The database defining the overlay network is built using several pieces of data. Namely, the data includes location information of the plurality of client devices 102, performance parameters of the plurality of wireless networks 104 and an associated timestamp marking when the performance parameters were collected. The plurality of client devices 102 collect performance parameters from the plurality of wireless networks 104, which the plurality of client devices 102 have available while they travel around various geographic areas. Each client device, such as client device 108, of the plurality of client devices 102 also collects location information of the individual client device when the performance parameters are collected. The location information and the performance parameters collected by the plurality of client devices 102 are then transferred to the server 106.

Additionally, a timestamp is associated with the location information and the performance parameters and represents a time when the location information and the performance parameters were collected by the plurality of client devices 102 or the received by the server 106. This timestamp is either applied by the plurality of client devices 102 and sent to the server 106, or the server 106 applies a timestamp when the data is received.

After the data is received, server 106 subsequently analyzes it to build the database 112 of default wireless networks in a geographic area during a time window. The server 106 then shares this database 112 with each individual client device, such as client device 108, comprising the plurality of client devices 102. The plurality of client devices 102 can then make an informed decision on which wireless network of the plurality of wireless networks 104 to connect based on the default wireless networks in the shared database 112.

Additionally, the server 106 will also track primary use locations of an individual client device, such as client device 108. A typical user carrying a client device 108 will travel to several locations throughout the course of a day based on a routine. Therefore, client device 108 will spend large portions of time each day in consistently the same general location, such as at a user's home or at a user's office, which can be referred to as a user's primary use locations. As the client device 108 continues to collect wireless network performance parameters and the location information associated with the wireless network performance parameters, a bulk of data pertaining to these primary use locations will be collected. The server 106 will analyze the location information and the associated timestamp to determine a geographic area and time window for when the client device 108 is within the primary use location. Using this information, the server 106 will develop an individually tailored default wireless network for these primary use locations for each individual client device, such as client device 108. These primary use location default wireless networks can be stored at the server 106, or the server 106 can determine the default wireless network and then transfer that default wireless network for storage at the client device 108.

In this manner, the overlay network is defined on at least two levels—a coarse level and a fine level. The coarse level are default wireless networks determined based on performance parameters collected by the plurality of client devices 102 over all geographic areas traversed by the plurality of client devices 102. The fine level are default wireless networks determined based on performance parameters from both the coarse level determination and supplemented by the bulk performance parameter measurements performed by an individual client device, such as client device 108, as it travels to and stays within one of its primary use locations. Generally, the fine level of the overlay network will be associated with the individual client device 108 because it is of primary use to that client device. However, when other client devices from the plurality of client devices 102 are in a similar use location as the client device's 108 primary use locations, then the default wireless networks from the fine level can be used to determine a default wireless network for the other client device.

The plurality of client devices 102 may be a mobile device such as a smart phone, a tablet computer, a laptop computer, a watch with a computer operating system, a personal digital assistant (PDA), a video game console, a wearable or embedded digital device(s), or any one of a number of additional devices capable of communicating over the plurality of wireless networks 104.

The plurality of wireless networks 104 include but are not limited to Wide Area Networks (WAN) such as a Long Term Evolution (LTE) network, a Global System for Mobile Communications (GSM) network, a Code Division Multiple Access (CDMA) network, Wireless Local Area Networks (WLAN) such as the various IEEE 802.11 standards, or any other kind of wireless network. The plurality of wireless networks 104 allow the plurality of client devices 102 to communicate with the server 106. For example, client device 108 may transmit information to the server 106 and receive information from the server 106 through wireless network 110. Further, the plurality of wireless networks 104 may include a set of cell towers, as well as a set of base stations and/or mobile switching centers (MSCs). In some embodiments, the plurality of wireless networks 104 may include various cell tower/base station/MSC arrangements.

As an aside, whether because of technological limitations or geographic limitations, not every client device of the plurality of client devices 102 will be able to connect to each of the plurality of wireless networks 104. In this manner, each individual client device from the plurality of client devices 102 will only report performance parameters from the individual wireless networks the individual client device is able to communicate with. For ease of description, embodiments of the disclosure described herein will refer to the plurality of client devices 102 collecting performance parameters from the plurality of data networks 104 even though it is understood that not every client device of the plurality of client devices 102 will communicate with every wireless network of the plurality of wireless networks 104.

Further, server 106 is illustrated as a single server hosting a service providing the database 112. However, server 106 could be implemented as a plurality of servers hosting a service for a plurality of specified geographic areas, or server 106 could be implemented as a cloud server. The singular server 106 is illustrated for ease of description. This singular server illustration is not intended to limit the disclosure contained herein.

Even further, as discussed above, the plurality of wireless networks 104 can be any wireless network such as the WAN network and WLAN networks above. However, for ease of description, the following will generally be discussed in terms of wireless carrier networks, such as those employed by various telecommunications service providers.

Figure 2A:
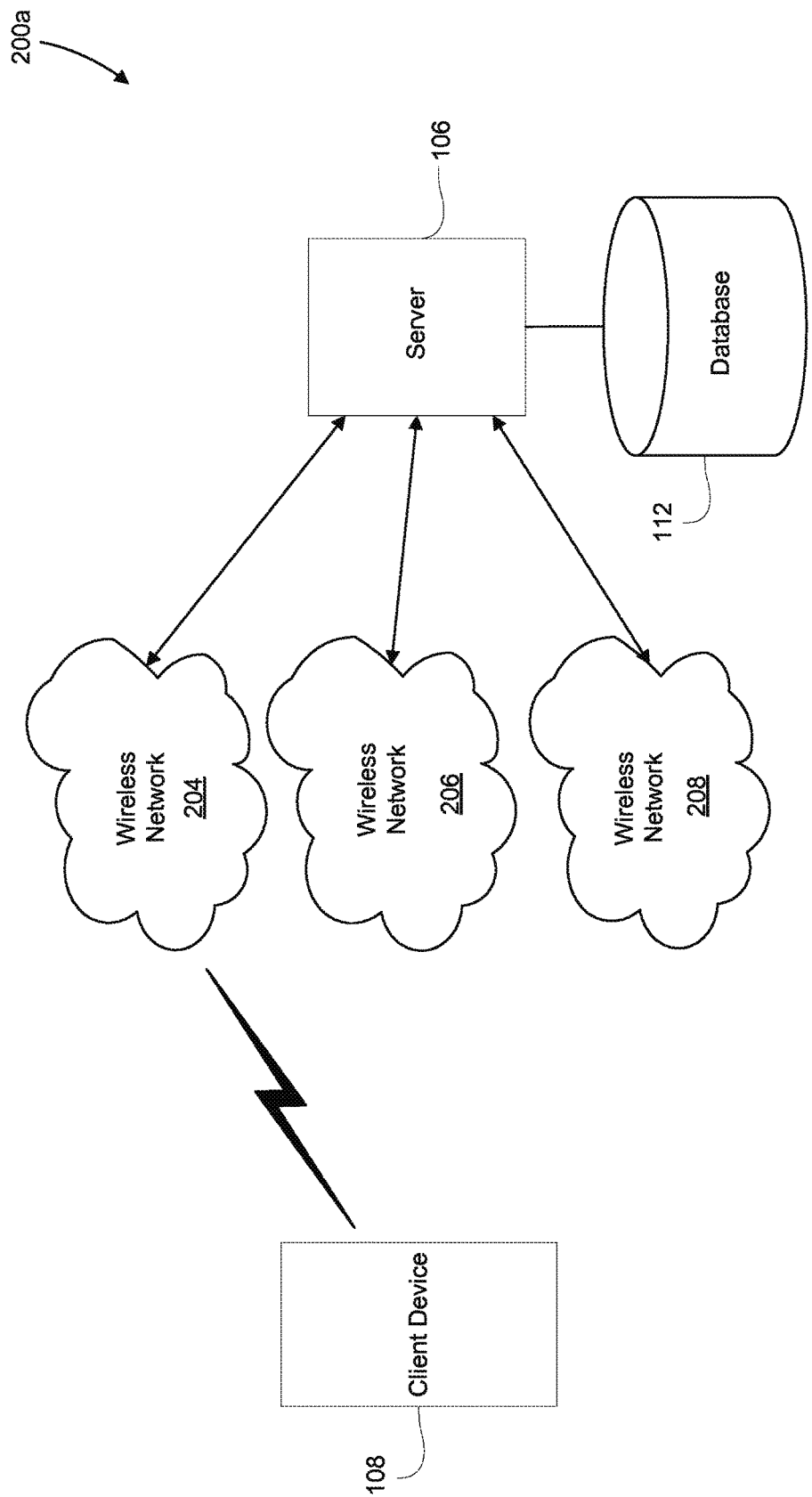
FIGS. 2a-2c are block diagrams illustrating example embodiments of the system of FIG. 1.
Figure 2B:
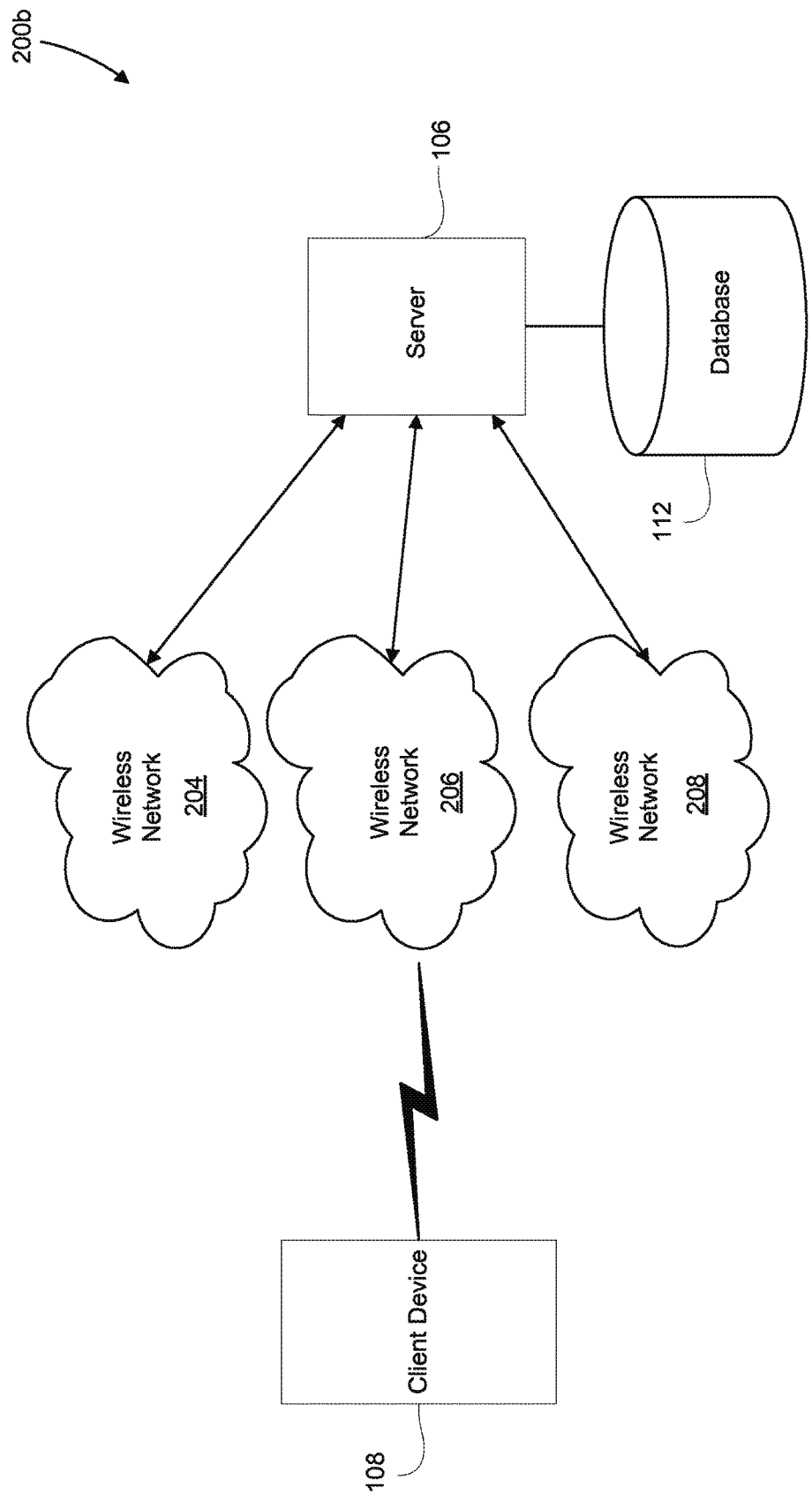
Figure 2C:
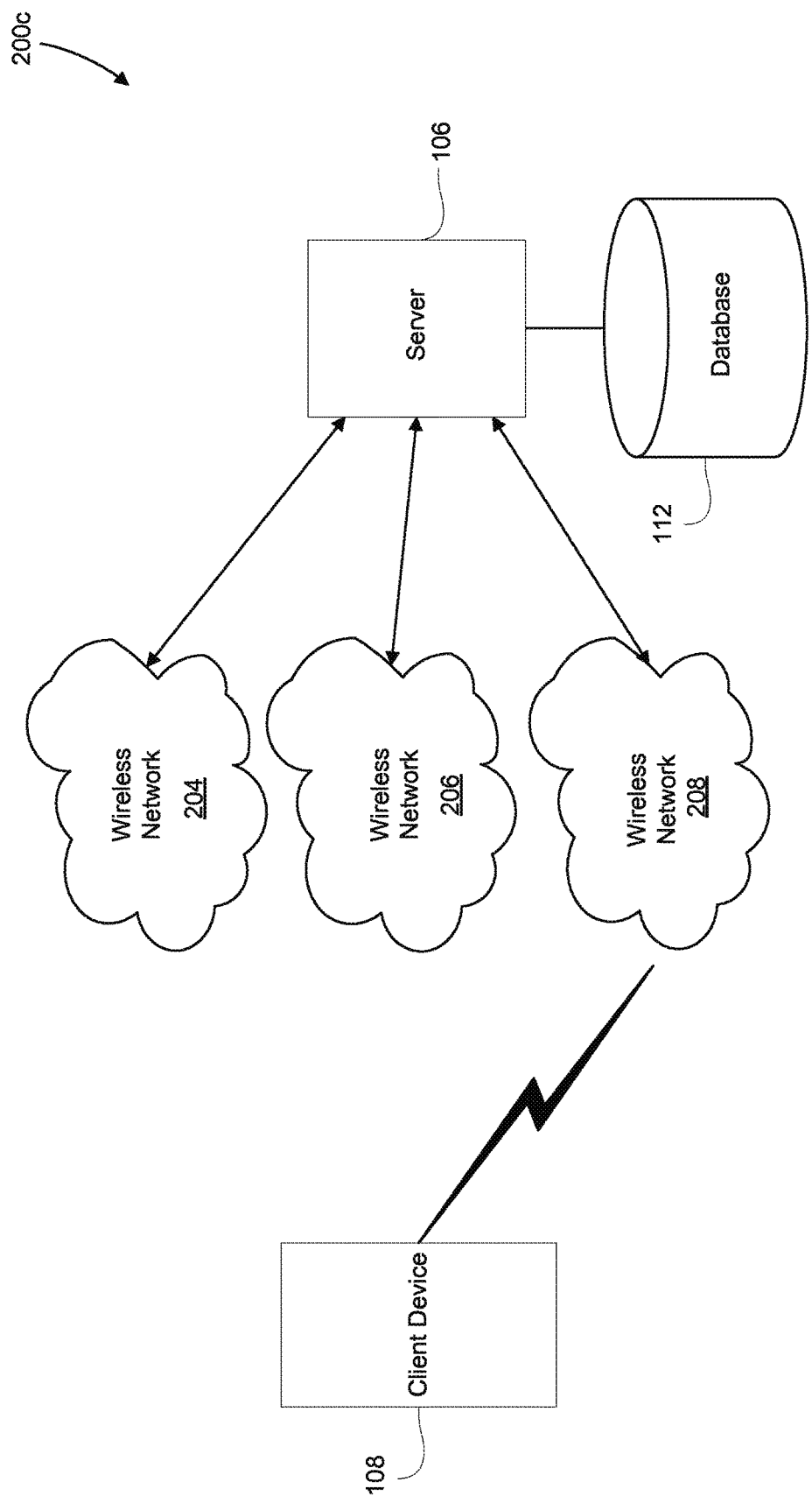

FIGS. 2a, 2b and 2c illustrate systems 200a, 200b and 200c for a single client device 108 in various geographic areas and the wireless networks 204, 206 and 208 available to the client device 108 in each location. As an aside, while the available wireless networks 204, 206 and 208 are illustrated as being available in each of FIGS. 2a, 2b and 2c, this does not have to be the case. Each location could have an entirely different set of wireless networks available in each location, or only a subset of wireless networks 204, 206 and 208 could be available. The specific embodiments illustrated in FIGS. 2a, 2b and 2c are only exemplary embodiments, and therefore are not intended to limit the concepts discussed herein but rather to illustrate concepts of the disclosure contained herein.

FIG. 2a illustrates a client device 108 in a static position at a user's home. FIG. 2b illustrates the client device 108 traveling between two destinations, such as between the user's home and a user's office. FIG. 2c illustrates a client device 108 in a static position at the user's office. While at home, traveling or in the office, the client device 108 is illustrated as having three wireless networks 204, 206 and 208 available. Client device 108 is configured to periodically query its location and collect performance parameters from the available wireless networks 204, 206 and 208. The client device 108 will collect this information either automatically or at the request of the server 106.

The collected location information can be collected in a variety of ways and specify the location of client device 108 to a varying degree of specificity. For instance, in one embodiment, one such method to collect location information would be to collect Global Positioning System (GPS) (not illustrated) coordinates, which would provide a geographic location with a high degree of specificity. In other embodiments, where the client device 108 is unable to communicate with the GPS network, or the GPS functionality on the client device 108 is turned off, the client device 108 attempts to ascertain its location based on its connection to wireless networks 204, 206 and 208. For example, the client device 108 can triangulate its position based on a measured signal strength received from at least two data networks. Or, the client device 108 can estimate its distance from one of the wireless networks 204, 206 and 208 based on a signal strength measurement.

The location information is collected periodically whether the device is static, as in FIGS. 2a and 2c, or whether the device is traveling, such as in FIG. 2b. In this regard, the server 106 is able to determine primary use locations for the client device 108. For instance, by tracking the geographic area the location information pertains to and an associated timestamp, the server 106 will be able to determine where the client device 108 spends a majority of time. These geographic areas are considered primary use locations.

As discussed above, based on the location of the client device 108, the performance parameters reported by client device 108 will either have a fine level or coarse level. For instance, FIGS. 2a and 2c (user at home and user at the office), represent primary use locations where the data collection will provide a fine level of detail. Because client device 108 spends a majority of time in the primary use locations and is consistently collecting data on a periodic basis, it will be able to collect fine tuned data at the primary use location that will help to specify smaller geographic areas in which to determine a default wireless network, which in turn should enable a more consistent quality of service from the available wireless networks. If a user's home is a primary use location, then over time as more data is collected periodically, a finer level of detail will be able to show, over a smaller geographic area, which wireless network should be deemed the default wireless network. For instance, a client device 108 may have one default wireless network at a top floor of a user's home as compared to a basement level of the user's home.

FIG. 2b represents a user location such as traveling between two primary use locations. In this scenario, the client device 108 will be moving over a large geographic area that may encompass many wireless networks of the plurality of wireless networks 104 (see FIG. 1). Additionally, because the user is moving and the client device 108 collects data periodically, less data, as compared to collection from a primary use location, will be collected within the various geographic areas the client device 108 moves through because less time is spent in each geographic area. Accordingly, the data collected by the client device 108 will provide a coarse level of detail. Therefore, the overlay network will be formed by a collection of data from the plurality of client devices 102 (see FIG. 1) in order to provide as much data as possible.

Client device 108 also collects a variety of performance parameters from wireless networks 204, 206 and 208. The performance parameters collected include, but are not limited to various combinations of: signal strength, call failure statistics, and data performance. Data performance is collected either passively or actively. For instance, data performance could be determined passively by collecting the throughput in Mbps (mega bits per second) over a current period measured from all the data activity done by the user. Data performance could be collected actively by downloading content from a bastion server (not illustrated) or making a voice call to a test service and then measuring the performance of the test call. In any scenario, the client device 108 will report the performance parameters along with the location information of the client device 108 when the data was collected to the server 106.

The reported performance parameters and location information are used in conjunction with an associated timestamp (either sent from the client device 108 or applied at the server 106) to build the database 112 defining the overlay network. In this regard, the server 106 is configured to receive the reported performance parameters and the location information. The server 106 will also associate a timestamp with each individual data point of performance parameters and location information for each of wireless networks 204, 206 and 208. As the data pertaining to each wireless network 204, 206 and 208 is collected, the server 106 will aggregate the data such that all of the performance parameters for each individual network are associated with reported location information and a timestamp. The time stamp can be used in conjunction with the primary use locations, discussed above, to determine when the client device 108 is in the primary use location—such as at home or the office.

Once the reported data and the timestamp are aggregated, the server 106 quantizes the data based on the reported location information and the timestamp. Quantizing based on location information requires grouping the performance parameters for each wireless network 204, 206 and 208 to an appropriate level of granularity. For instance, as in FIGS. 2a and 2c, when the client device 108 is generally in a static location such as the primary use locations of the user's home or office, the reported location information will not change greatly. Therefore, the geographic area defining the location information for the primary use location of the user's home or office is relatively small when compared to the use situation in FIG. 2b, where the client device 108 is traveling between the user's home or office, and because the user spends a majority of time in the primary use locations the geographic area(s) are determined with a more fine level of detail and used primarily by the individual client device 108. In the scenario illustrated in FIG. 2b, the reported location information encompasses a relatively large geographic area as compared to the scenarios illustrated in FIGS. 2a and 2c, and are therefore the geographic area(s) in FIG. 2b are defined using a coarse level of detail from the plurality of client devices 102.

As an aside, while FIG. 2b only illustrates three wireless networks 204, 206 and 208, more than three may be applicable. For instance, if the geographic area is too large, such that the three wireless networks 204, 206 and 208 do not define the entirety of the distance traveled, then multiple geographic areas could be related to the travel distance illustrated in FIG. 2b. Each geographic area could have a subset of wireless networks 204, 206 and 208 or different wireless networks altogether. In the scenario where new wireless networks are required, the location information and the associated performance parameters will be quantized such that multiple geographic areas are defined along the travel path, each with an associated set of available wireless networks, such as wireless networks 204, 206 and 208.

The reported performance parameters and location information are further quantized based on the associated timestamp. As travel patterns change throughout the course of a day more or less of the plurality of client devices 102 (see FIG. 1) will be active in different geographic areas. Accordingly, congestion at the plurality of wireless networks 104 will change at various periods of time throughout the day. Further, using the associated timestamp, the server 106 is able to determine a time window during which the client device 108 is within one of the primary use locations, such as the home, office or traveling between the home or office. Also, the associated timestamp can be utilized to weight the reported performance parameters. For instance, the more recently collected performance parameters could be weighted more heavily in any determination of a default wireless network.

The result of the aggregation and quantization by the server 106 is a collection of performance parameters organized by geographic area and time window. Accordingly, the server 106 determines a default wireless network by analyzing the performance parameters within each geographic area and time window. In certain embodiments, the determination is based on a weighted average of signal strength, data throughput in Mbps and call failure rates. In other embodiments, the determination could be made based solely on signal strength.

As an aside, in certain embodiments, the quantization could be based on an analysis of the performance parameters. For instance, once the performance parameters are aggregated based on location information and timestamp, an analysis of the performance parameters may be done to determine a total geographic area and time window where a particular wireless network provides better service than other wireless networks available within that geographic area and time window. This particular wireless network would then become the default wireless network for that quantized geographic area over the relevant time window. Once the data shows that either because of time or distance, a new wireless network is more effective, then a new quantization is developed such that a different wireless network will be made the default wireless network. For example, in FIG. 2b, depending on a time window and geographic area, client device 108 may attach to each of wireless networks 204, 206 and 208 as one network provides better service than the others. This is achieved by the server 106 analyzing the performance parameters and setting the quantization levels appropriately to maintain the best service possible by reviewing each of the wireless networks 204, 206 and 208 to see where each independently provide the best service. In certain embodiments, the analysis of the performance parameters may come prior or be performed in parallel to the quantization.

Once a default wireless network is determined, the server 106 will assign the determined default wireless network to a database entry categorized by the geographic area and time window. In this manner, the database 112 can be searched and a default wireless network provided based on two pieces of information—a location and a time of day, which will serve as a key that enables a default wireless network to be found.

Sever 106 will then share the database 112 with the client device 108. In one embodiment, the client device 108 will request, from the server 106, the default wireless network based on the current location of the client device and an associated timestamp for the request. The server 106 will then reference the database 112 based on location and time to determine a default wireless network and provide the default wireless network to client device 108. In another embodiment, the client device 108 queries the database 112 for the previously defined primary use locations based on location and the time window the user typically spends in the primary use locations. The server 106 obtains the default wireless networks for the primary use locations during the relevant time windows and transmits them to the client device 108 where they are stored locally.

Once the client device 108 has obtained a default wireless network, the client device 108 will only switch to a new wireless network when it leaves the specified geographic area or the time window changes such that a different default wireless network is applicable. In a particular embodiment, the switch could also only occur when the client device 108 is idle. In this manner, disruption for current application processes on the client device 108 would be minimal. In other embodiments, if the default wireless network happens to be performing poorly, the client device 108 will search for a new wireless network to attach to out of the available wireless networks.

In this manner, the client device 108 will include a real time network attach algorithm. The real time network attach algorithm is used to complement the system described above such that if the default wireless network happens to be performing poorly, the client device 108 will be able to connect to a different but currently better performing wireless network.

As discussed above, FIGS. 2a, 2b and 2c illustrate three separate use scenarios of client device 108. FIG. 2a illustrates a first primary use location such as a user's home where the default wireless network is wireless network 204. Therefore, while the user is at this particular primary use location, client device 108 will only attach to wireless network 204, unless wireless network 204 is providing poor service. Once the user exits a primary use location, the client device 108 will be able to attach to a different wireless network, such as wireless networks 206 and 208. For instance, FIG. 2b illustrates a user traveling between primary use locations, such as the home and the office. For ease of description, the default wireless network is illustrated as only being wireless network 206. However, depending on the geographic area between a user's home and office, many more wireless networks may be available and determined to be a default wireless network. As illustrated in FIG. 2b, while client device 108 is traveling between primary use locations, client device 108 will only attach to wireless network 206, unless wireless network 206 is providing poor service. Also, once the user exists the geographic area serviced by default wireless network 206, the client device 108 will once again switch to a new default wireless network for the new geographic area, such as in FIG. 2c, which illustrates a user at the office. In this scenario, wireless network 208 is the default wireless network. Therefore, while at this primary use location, the client device will only attached to wireless network 208, unless wireless network 208 is performing poorly.

As discussed above, each of the illustrated embodiments in FIGS. 2a, 2b and 2c show only three available networks. Each of these scenarios may have more or less than three available wireless networks. Additionally, the wireless networks 204, 206 and 208 are only illustrated. More or less or completely different wireless networks may be available in any of the illustrated scenarios. Each scenario illustrated in FIGS. 2a, 2b and 2c may be quantized to further levels of granularity such that multiple geographic areas or time windows each with its own default wireless network may be present in a user's home, office or traveling between the home and the office. The above description of building and sharing the database 112 of default wireless networks would remain the same in this scenario except that the level of quantization in the database 112 would change.

Figure 3:
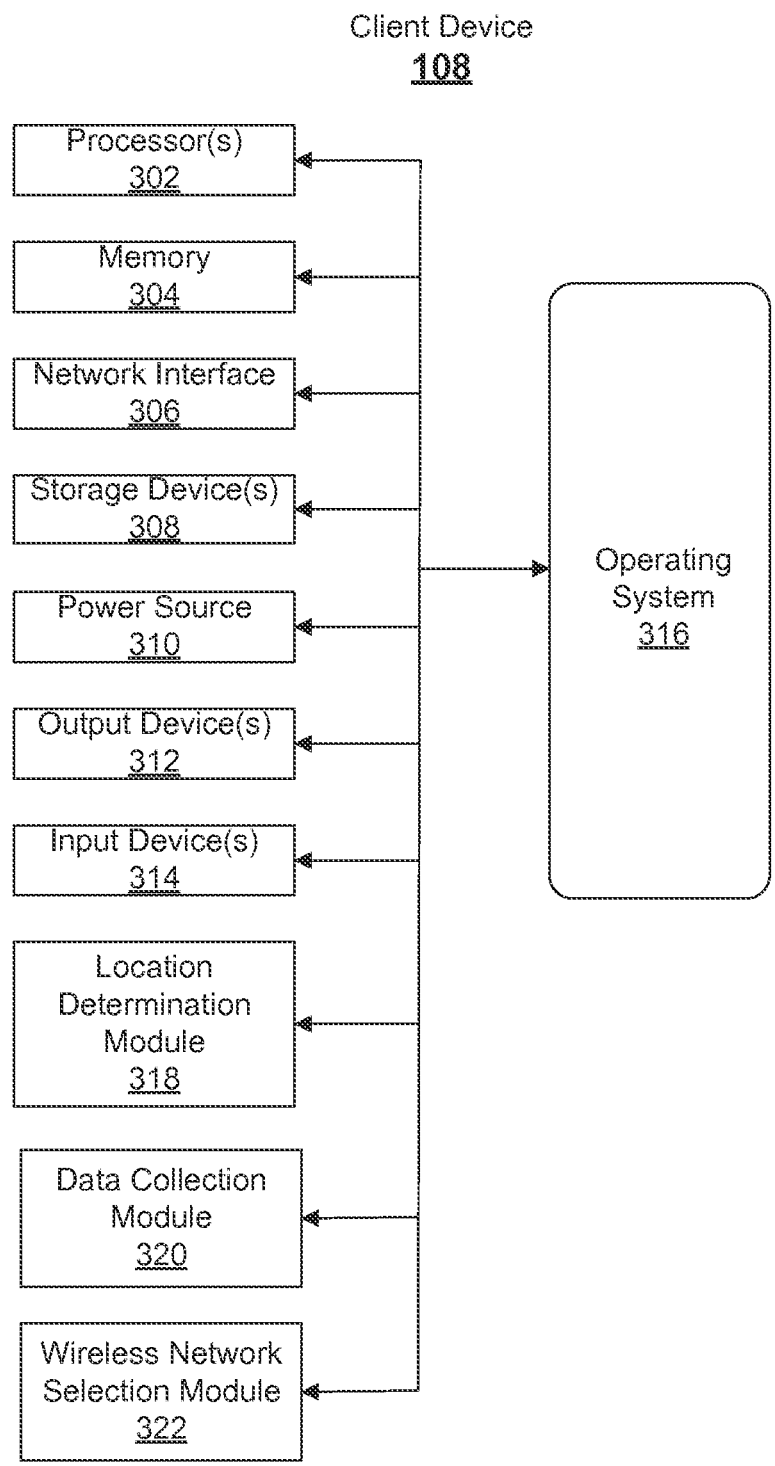
FIG. 3 is a block diagram illustrating components of a client device from the system illustrated in FIG. 1, according to an example embodiment.

Turning now to FIG. 3, a block diagram of basic functional components for an individual client device, such as client device 108 (see FIG. 1), of the plurality of client devices 102 (see FIG. 1), according to one aspect of the disclosure, is illustrated. In general, many other embodiments of the client device 108 may be used. In the illustrated embodiment of FIG. 3, the client device 108 includes one or more processors 302, memory 304, a network interface 306, one or more storage devices 308, power source 310, one or more output devices 312, one or more input devices 314, a location determination module 318, a wireless collection module 320 and a wireless network selection module 322. The client device 108 also includes an operating system 316. Each of the components including the processor 302, memory 304, network interface 306, storage device 308, power source 310, output device 312, input device 314, operating system 316, location determination module 318, data collection module 320 and wireless network selection module 322 is interconnected physically, communicatively, and/or operatively for inter-component communications.

As illustrated, processor 302 is configured to implement functionality and/or process instructions for execution within client device 108. For example, processor 302 executes instructions stored in memory 304 or instructions stored on a storage device 308. Memory 304, which may be a non-transient, computer-readable storage medium, is configured to store information within client device 108 during operation. In some embodiments, memory 304 includes a temporary memory, an area for information not to be maintained when the client device 108 is turned off. Examples of such temporary memory include volatile memories such as random access memories (RAM), dynamic random access memories (DRAM), and static random access memories (SRAM). Memory 304 also maintains program instructions for execution by the processor 302.

Storage device 308 also includes one or more non-transient computer-readable storage media. The storage device 308 is generally configured to store larger amounts of information than memory 304. The storage device 308 may further be configured for long-term storage of information. In some examples, the storage device 308 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 108 uses network interface 306 to communicate with external devices via one or more networks, such as the wireless networks 204, 206 and 208 (see FIG. 2), one or more data networks, and other types of networks through which a communication with the client device 108 may be established. Network interface 306 may be a network interface card, such as an Ethernet card, an optical transceiver, a radio frequency transceiver, or any other type of device that can send and receive information. Other non-limiting examples of network interfaces include Bluetooth®, 3G and Wi-Fi radios in client computing devices, and USB.

The client device 108 includes one or more input devices 314. Input devices 314 are configured to receive input from a user or a surrounding environment of the user through tactile, audio, and/or video feedback. Non-limiting examples of input device 314 include a presence-sensitive screen, a mouse, a keyboard, a voice responsive system, video camera, microphone or any other type of input device. In some examples, a presence-sensitive screen includes a touch-sensitive screen.

One or more output devices 312 are also included in client device 108. Output devices 312 are configured to provide output to a user using tactile, audio, and/or video stimuli. Output device 312 may include a display screen (part of the presence-sensitive screen), a sound card, a video graphics adapter card, or any other type of device for converting a signal into an appropriate form understandable to humans or machines. Additional examples of output device 312 include a speaker such as headphones, a cathode ray tube (CRT) monitor, a liquid crystal display (LCD), or any other type of device that can generate intelligible output to a user.

The client device 108 includes one or more power sources 310 to provide power to the device. Non-limiting examples of power source 310 include single-use power sources, rechargeable power sources, and/or power sources developed from nickel-cadmium, lithium-ion, or other suitable material.

The client device 108 includes an operating system 316. The operating system 316 controls operations of the components of the client device 108. For example, the operating system 316 facilitates the interaction of the processor(s) 302, memory 304, network interface 306, storage device(s) 308, input device 314, output device 312, and power source 310.

The client device 108 uses the location determination module 318 to determine a geographic location of the client device 108. This location determination module 318 can be a GPS transceiver or a state of the processor 302, which is defined by a series of instructions stored on the memory 304 or storage device 308 that when executed cause the processor 302 to triangulate a geographic location of the client device 108 based on any available data network connections.

In certain embodiments of the disclosure, the client device 108 further includes a wireless data collection module 320 and a wireless network selection module 322. In certain embodiments, both the wireless data collection module 320 and the wireless network selection module 322 represent various states of the processor 302, and are defined by program instructions and/or data stored on the memory 304 or the storage device 308.

The wireless collection module 320 configures the client device 108 to collect performance parameters from the plurality of networks 104 (see FIG. 1). Once the performance parameters are collected for an individual data network, such as data network 110 (see FIG. 1), then the wireless collection module 320 configures the client device 108 to upload, to the server 106 (see FIGS. 1 and 2), location information (determined by the location determination module 318) pertaining to a location of the client device 108 when the performance parameters were collected, and the actual performance parameters collected.

The wireless network selection module 322 configures the client device 108 (see FIG. 1) to receive the default wireless network either automatically based on when the server 106 shares the default wireless network database 112 or by submitting a request to server 106. In the embodiment where the client device 108 requests the default wireless network, the client device 108 will send a key containing the current location information to the server 106. The server 106 will receive the current location information and associate a timestamp. Using both the current location information and the associated timestamp, the server 106 will reference the database 112 to determine the appropriate default wireless network. The server 106 then shares the appropriate default wireless network with the wireless network selection module, which in turns directs the client device 108 to attach to the default wireless network. As an aside, in certain embodiments, the key sent by the client device 108 to server 106 may also contain a timestamp in addition to the current location information. In this embodiment, the server 106 will not have to produce the timestamp of when the current location information was received.

In the embodiment where the default wireless network is received automatically, the server 106 will send the default wireless network to the wireless network section module based on the location information uploaded to the server 106 from the client device 108 or an associated timestamp. Once the server 106 determines the client device 108 has entered a new geographic area or a new time window requiring a different default wireless network, the server 106 will send the default wireless network to the client device 108, which then attaches to the new default wireless network.

The wireless network selection module 322 is further configured to run the real time network attach algorithm. When the default wireless network is performing poorly, the wireless network selection module 322 will review real time wireless network performance parameters of all available wireless networks to determine an alternative to the default wireless network.

Figure 4:
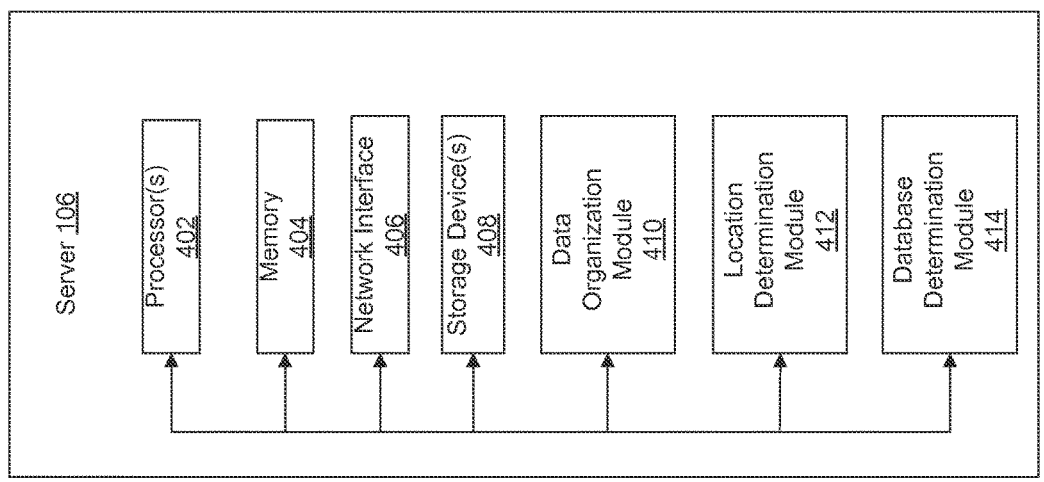
FIG. 4 is a block diagram illustrating components for a server from the system illustrated in FIG. 1, according to an example embodiment.

Moving to FIG. 4, a block diagram of basic functional components for a server 106 (see FIGS. 1 and 2) is depicted, according to one aspect of the disclosure. Specifically, server 106 is configured to receive location information from the plurality of client devices 102 and performance parameters for the plurality of wireless networks 104 (see FIG. 1) and create a database 112 of default wireless networks arranged by keys that uniquely identify a default wireless network of the plurality of data networks 104 based on geographic area and a time window.

The server 106 includes one or more processors 402, memory 404, network interface 406, one or more storage devices 408, a data organization module 410, location determination module 412, and a database determination module 414. In some embodiments, each of the components including the processor(s) 402, memory 404, network interface 406, storage device 408, data organization module 410, location determination module 412, and database determination module 414 are interconnected physically, communicatively, and/or operatively for inter-component communications.

As illustrated, processors 402 are configured to implement functionality and/or process instructions for execution within server 106. For example, processors 402 execute instructions stored in memory 404 or instructions stored on storage devices 408. Memory 404, which may be a non-transient, computer-readable storage medium, is configured to store information within server 106 during operation. In some embodiments, memory 404 includes a temporary memory, i.e. an area for information not to be maintained when the server 106 is turned off. Examples of such temporary memory include volatile memories such as random access memories (RAM), dynamic random access memories (DRAM), and static random access memories (SRAM). Memory 404 also maintains program instructions for execution by the processors 402.

Storage devices 408 also include one or more non-transient computer-readable storage media. Storage devices 408 are generally configured to store larger amounts of information than memory 404. Storage devices 408 may further be configured for long-term storage of information. In some examples, storage devices 408 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The server 106 uses network interface 406 to communicate with external devices via one or more networks, such as the wireless networks 204, 206 and 208 of FIGS. 2a, 2b and 2c. Such networks may include one or more wireless networks, wired networks, fiber optics networks, and other types of networks through which communication between the server 106 and an external device may be established. Network interface 406 may be a network interface card, such as an Ethernet card, an optical transceiver, a radio frequency transceiver, or any other type of device that can send and receive information.

In certain embodiments of the disclosure, the server 106 further includes the data organization module 410, the location determination module 412, and the database determination module 414. In certain embodiments, the data organization module 410, the location determination module 412, and the database determination module 414 represent various states of the processor 402, and are defined by program instructions and/or data stored on the memory 404 or the storage device 408.

The location determination module 412 configures the server 106 (see FIG. 1) to determine primary use locations of the plurality of client devices 102. The location determination module 412 determines primary use locations of a client device, such as client device 108 based on the reported location information and associated timestamp. The location determination module 412 aggregates all of the location information received from an individual client device, such as client device 108, and analyzes the location information to determine a list of primary use locations. The location determination module 412 then provides the primary use locations for the client device 108 to the database determination module 414 such that a default wireless network can be determined for the primary use location.

The data organization module 410 configures the server 106 to organize the performance parameters from the plurality of networks 104 (see FIG. 1) sent by the plurality of client devices 102. As discussed above, the plurality of client devices 102 upload, to the server 106 (see FIGS. 1 and 2a, 2b and 2c) collected location information pertaining to a location of each individual client device (of the plurality of client devices 102) such as client device 108 when the performance parameters were collected, and the actual performance parameters collected. The data organization module 410 will associate the received location information with the reported performance parameters such that the location information from the client device 108 is associated with corresponding performance parameters from wireless networks, such as wireless networks 204, 206 and 208 (see FIGS. 2a, 2b and 2c) available at the geographic area comprising the location information.

The data organization module 410 further associates a timestamp with the received location information and performance parameters. In certain embodiments, the timestamp is received from the client device 108 along with the location information and performance parameters; however, in other embodiments, the timestamp is produced by the server 106 when the location information and the performance parameters are received and subsequently associated with the received location information and the received performance parameters.

The data organization module 410 is further configured to aggregate all of the received performance parameters per location and per timestamp. Once the performance parameters are aggregated, the data organization module 410 proceeds to quantize the performance parameters based on the location information and the timestamp. The quantization defines geographic areas and time windows of appropriate size such that a default wireless network will be likely to provide the best service of all available wireless networks within that geographic area and during the time window.

The database determination module 414 configures the server 106 to build a database entry for each geographic area during each time window, and inside of each entry, the database determination module 414 will insert a default wireless network. The default wireless network is determined by analyzing the performance parameters associated with the geographic area during the time window. In one embodiment, the default wireless network is determined by assigning the available wireless network with the highest signal strength. Another embodiment, takes a weighted average of signal strength from the available wireless networks, the data throughput in Mbps and call failure rates, and assigns the default wireless network based on this weighted average.

The database determination module 414 is further configured to associate the determined default wireless network with the geographic area during a certain time window. In this regard, a client device, such as client device 108 (see FIG. 1) can request the default wireless network by submitting a request to server 106 along with the key, which provides at least the current location information of the client device 108 and in certain embodiments a timestamp will be sent as well. Using both the current location information and the timestamp, the default wireless network in the database 112 can provided to the client device 108.

In certain embodiments, the quantization performed by the data organization module 410 will rely on the analysis of the performance parameters done by the database determination module 414. For instance, once the performance parameters are aggregated based on location information and timestamp, an analysis of the performance parameters may be performed to determine a total geographic area and time window where a particular wireless network provides better service than other wireless networks available within that geographic area and time window. This particular wireless network would then become the default wireless network for that quantized geographic area over the relevant time window. Once the data shows that either because of time or distance, a new wireless network is more effective, then a new quantization is developed such that a different wireless network will be made the default wireless network. In certain embodiments, the analysis of the performance parameters may come prior to or be performed in parallel with the quantization.

Figure 5:
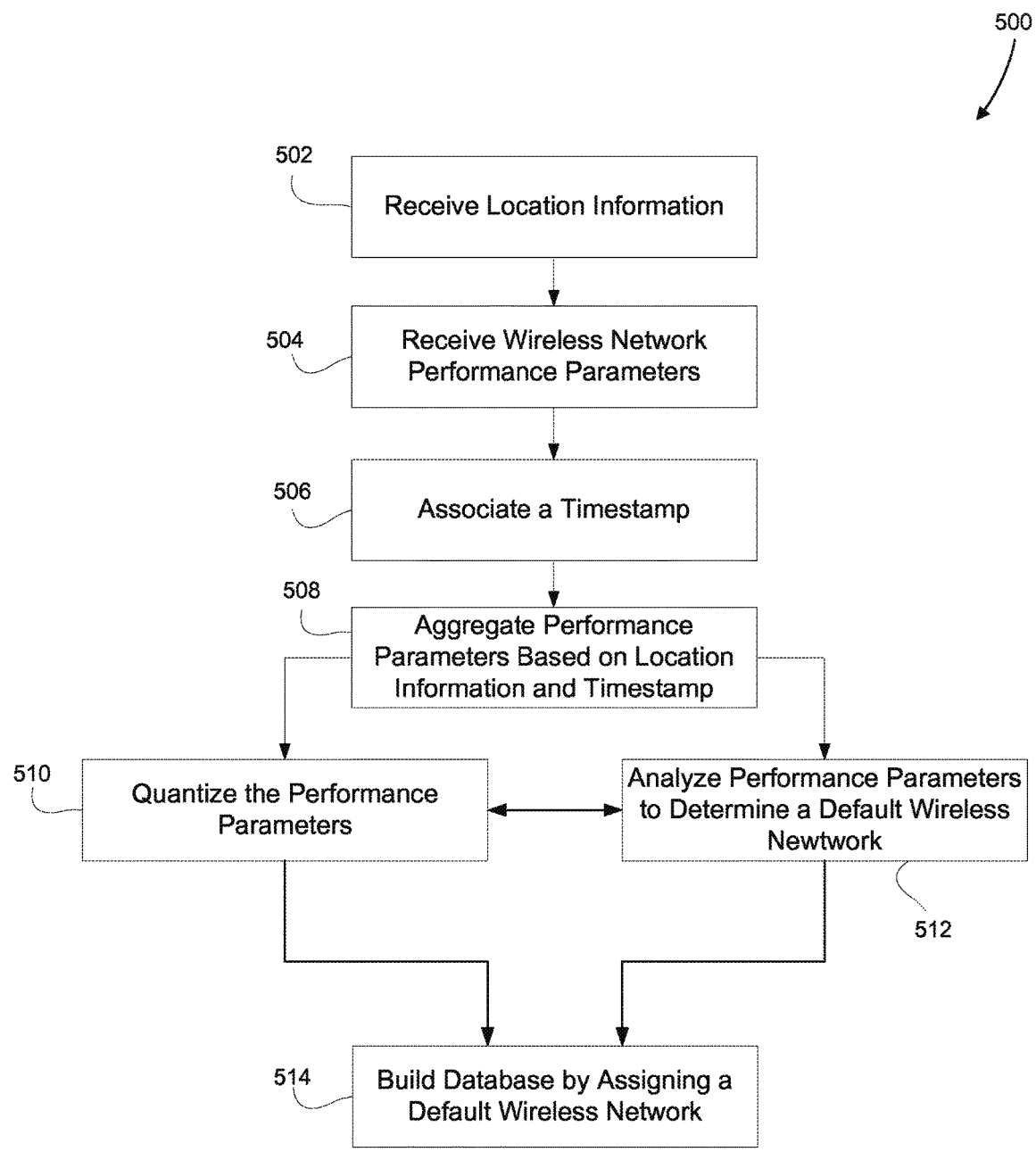
FIG. 5 is a flow diagram for building an overlay network, according to an example embodiment.
Figure 6:
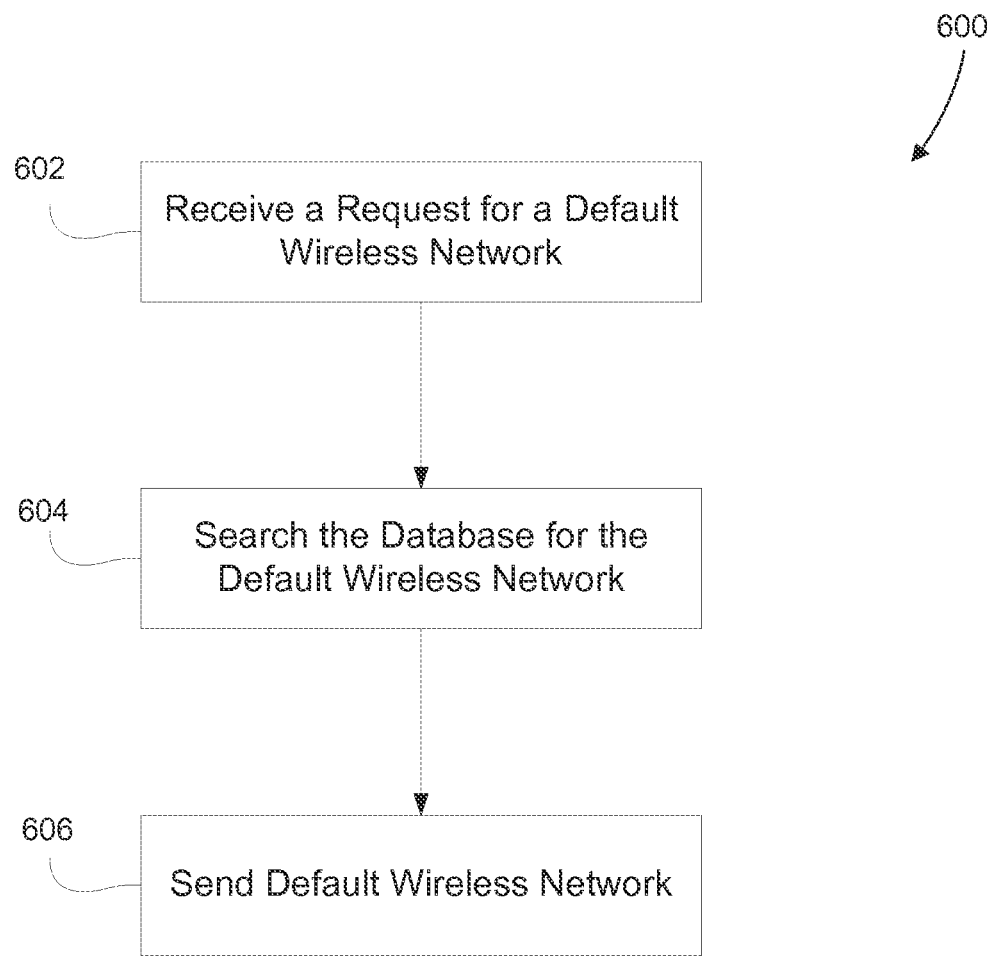
FIG. 6 is a flow diagram for sharing the overlay network with a client device, according to an example embodiment.
Figure 7:
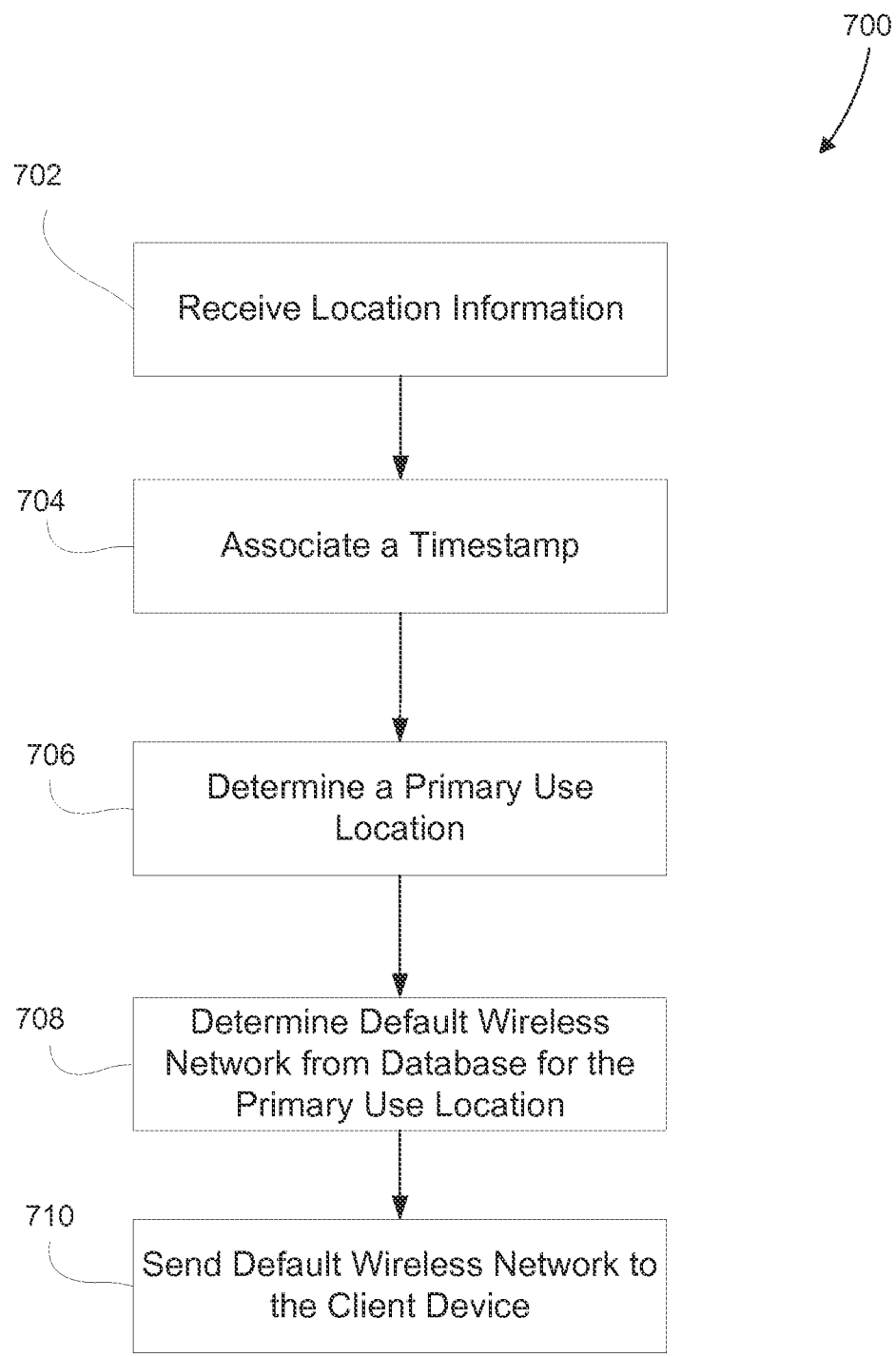
FIG. 7 is a flow diagram for determining a primary use location of a client device and providing a default wireless network for the primary use location, according to an example embodiment.

FIGS. 5-7 illustrate flow diagrams detailing various embodiments of the method and system for providing a default wireless network. FIG. 5 illustrates a flow diagram 500 for building an overlay network defined by a database of default wireless networks. At step 502, the server 106 (see FIG. 1) receives location information from the plurality of client devices 102. The location data is not received all at once. Rather, each individual client device, such as client device 108, reports its geographic location at the same time as it reports wireless network performance parameters for available wireless networks, such as wireless network 110.

At step 504, the server 106 (see FIG. 1) receives wireless network performance parameters from the plurality of client devices 102. The performance parameters are not received all at once. Rather, each individual client device, such as client device 108, reports wireless network performance parameters for available wireless networks, such as wireless network 110 whenever it reports its location information.

At step 506, a timestamp is associated with the received location information and the received performance parameters. The timestamp indicates a time when the data, comprising the location information and the performance parameters, was collected by the client device, such as client device 108 (see FIG. 1) or received by the server 106. If the timestamp represents the time when the data was collected by the client device, then the timestamp is applied by the client device 108 and sent along with the data to the server 106. If the timestamp represents the time when the data was received by the server 106, then the timestamp was applied by the server 106 when the data was received.

At step 508, the server 106 (see FIG. 1) aggregates the wireless network performance parameters for each individual wireless network of the plurality of wireless networks 104 based on the received location information and the associated timestamp. In this manner, performance parameters relating to an individual wireless network, such as wireless network 110, are gathered and sorted based on the location they were collected from and a time during which they were collected/uploaded by the client device 108 or received by the server 106.

At step 510, the aggregated wireless network performance parameters are then quantized. The quantization occurs on at least two levels—a geographic area and a time window. The wireless network performance parameters are quantized into an appropriately sized geographic area and further quantized to an appropriate time window, such as a specific hour of the day.

At step 512, server 106 (see FIG. 1) analyzes the aggregated performance parameters to build a database 112 entry for each quantized geographic area during each quantized time window, and inside of each entry, insert a default wireless network. The default wireless network is determined by analyzing the performance parameters associated with the geographic area during the time window. In one embodiment, the default wireless network is determined by assigning the available wireless network with the highest signal strength. Another embodiment, takes a weighted average of signal strength from the available wireless networks, the data throughput in Mbps and call failure rates, and assigns the default wireless network based on this weighted average.

In certain embodiments, the quantization performed at step 510 will rely on the analysis of the performance parameters during step 512. For instance, once the performance parameters are aggregated based on location information and timestamp, an analysis of the performance parameters may be performed to determine a total geographic area and time window where a particular wireless network provides better service than other wireless networks available within that geographic area and time window. This particular wireless network would then become the default wireless network for that quantized geographic area over the relevant time window. Once the data shows that either because of time or distance, a new wireless network is more effective, than a new quantization is developed such that a different wireless network will be made the default wireless network. In certain embodiments, the analysis of the performance parameters may come prior to or be performed in parallel with the quantization.

At step 514, the determined default wireless network is associated with the quantized geographic area during a quantized time window. In this regard, a client device, such as client device 108 (see FIG. 1) can request the default wireless network by submitting a request to server 106 along with the key, which provides at least the current location information of the client device 108 and in certain embodiments a timestamp will be sent as well. Using both the current location information and the timestamp, the default wireless network in the database 112 can be provided to the client device 108.

FIG. 6 illustrates flow chart 600 for a process of providing a default wireless network to a client device, such as client device 108 (see FIG. 1). At step 602, the server 106 (see FIG. 1) receives a request for a default wireless network. The request contains location information from a client device, such as client device 108, and a timestamp associated with the location information. The timestamp could be sent by client device 108 or applied by the server 106 when the location information is received.

Additionally, the request could be an active request or a passive request. An active request is when a requesting client device, such as client device 108 (see FIG. 1), makes a specific request for a default wireless network by sending its location information for the specific purpose of obtaining a default wireless network. A passive request is when a client device, such as client device 108, in the course of reporting its location information and wireless network performance parameters for available wireless networks, reports location information indicating the client device 108 has entered a new geographic area requiring a new default wireless network. Another form of passive request would be when an associated timestamp indicates a new time window has begun and the new time window requires a new default wireless network.

At step 604, the server 106 (see FIG. 1) searches the database 112 defining the overlay network. The search references a geographic area and a time window corresponding to the received location information and the associated timestamp to determine a default wireless network.

At step 606, the server 106 (see FIG. 1) sends the default wireless network to the requesting client device, such as client device 108. In certain embodiments, the default wireless network is provided to the client device 108 in real time. As illustrated in FIG. 2b, in situations where the performance parameters are collected from the plurality of client devices 102 at a coarse level over a large geographic area, the database 112 will be large and typically not practical to store the default wireless networks at the client device 108. Therefore, updating the client device 108 in real time, as a new default wireless network is needed, is more practical. However, for primary use locations, as illustrated in FIGS. 2a and 2c, where the performance parameters are collected at a more fine level over a smaller geographic area, the default wireless networks associated with the primary use locations may be stored locally at the client device 108, as there are fewer possibilities for available wireless networks over the smaller geographic area of the primary use locations.

FIG. 7 illustrates flow chart 700 for a process of determining a primary use location of an individual client device, such as client device 108 (see FIG. 1). At step 702, the server 106 receives location information from a client device 108.

At step 704, the server associates a timestamp with the received location information. The timestamp either comes from the client device 108 or is applied by the server 106 when the location information is received.

At step 706, the server 106 (see FIG. 1) will analyze the location information and the associated timestamp time for client device 108 to determine from where the bulk of data is obtained. Because the location information is reported periodically, as discussed above, the bulk of data will be collected from places where the client device 108 spends a predominant amount of time, such as at a user's home or office (see FIGS. 2a and 2c). Further, the associated timestamp can be analyzed to determine the time the client device 108 was at this particular location. The determined geographic area, defined by the bulk of location information, is determined to be a primary use location, and the time window or time windows based on the bulk of the associated timestamps is determined to be a time window or time windows of the primary use location. At step 708, the server 106 references the database 112 defining the overlay network for that geographic area and time window to obtain the default wireless network, and, at step 710, the server 106 sends the default wireless network to the client device 108. As mentioned earlier, the default wireless network may be sent to the client device 108 in real time, or the default wireless network is sent to the client device 108 ahead of time based on the determine primary use location and the determined time window or time windows the client device 108 spends at the geographic area of the primary use location. In this embodiment, where the default wireless network is sent prior to the client device 108 being in the primary use location geographic area or time window, the default wireless network will be stored locally and applied by the client device 108 once it determines it has entered the primary use location.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a server.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of providing an overlay wireless network, the method comprising:
    receiving, by a processor and from a plurality of client devices, location information and wireless network performance parameters of wireless networks available to the plurality of client devices;
    associating, by the processor, the received location information and the received wireless network performance parameters with a timestamp;
    aggregating, by the processor, the received wireless network performance parameters based on the received location information and the associated timestamp for each of the wireless networks available to the plurality of client devices;
    quantizing, by the processor, the wireless network performance parameters to a plurality of geographic areas based on the associated location information and to an at least one time window within each of the plurality of geographic areas based on the associated timestamp, the at least one time window corresponding to at least one period of time during a day;
    analyzing, by the processor, the quantized wireless network performance parameters to determine a default wireless network within each of the plurality of geographic areas and the at least one time window;
    building, by the processor, a database searchable based on the plurality of geographic areas and the at least one time window within each of the plurality of geographic areas; and assigning, by the processor, the determined default wireless network within each of the plurality of geographic areas and the at least one time window,
wherein the wireless network performance parameters comprise at least one from among a signal strength, call failure statistics, or data performance of the wireless networks.

2. The method of claim 1, further comprising:
receiving a request for the default wireless network, the request includes location information from an individual client device and an individual associated timestamp;
searching the database based on the received location information from the individual client device and the individual associated timestamp to obtain the default wireless network within a specific geographic location of the plurality of geographic areas and a specific time window of the at least one time window, the specific geographic area including a location indicated by the location information and the specific time window including a time indicated by the individual associated timestamp; and
sending the default wireless network to the individual client device.

3. The method of claim 1, further comprising:
determining primary use locations for each individual client device of the plurality of client devices based on the received location information;
determining a default wireless network for the primary use locations based on the received wireless network performance parameters; and
sending the default wireless network for the primary use locations to each individual client device of the plurality of client devices.

4. The method of claim 3, wherein the default wireless network for the primary use locations are stored locally at the individual client device of the plurality of client devices.

5. The method of claim 1, wherein the timestamp is received from the plurality of client devices.

6. The method of claim 1, wherein the determination of the default wireless network comprises: determining which individual wireless network within a single geographic area and a single time window has a superior signal strength; and assigning the individual wireless network with the superior signal strength as the default wireless network within the single geographic area during the single time window.

7. The method of claim 1, wherein the data performance is based on data throughput of the wireless networks available to the plurality of client devices.

8. The method of claim 7, wherein the data performance is determined by placing a test phone call to a test service and measuring a data throughput of the test phone call.

9. A system of providing an overlay network, the system comprising:
a plurality of client devices, each individual client device of the plurality of client devices configured to:
  determine location information of the individual client device;
  collect wireless network performance parameters from wireless networks available to the individual client device; and
  upload the wireless network performance parameters and the location information to a service hosting a database defining the overlay network, the database is configured to be searchable based on a geographic area during a time window specifying a period of time during a day in the geographic area; and
a server running the service, the server configured to:
  receive the wireless network performance parameters and the location information uploaded by the individual client device;
  associate a timestamp with the wireless network performance parameters and the associated location information uploaded from the individual client device;
  aggregate the wireless network performance parameters based on the location information and the associated timestamp;
  quantize the aggregated wireless network performance parameters into the geographic area during the time window;
  analyze the wireless network performance parameters to determine a default wireless network within the geographic area during the time window; and
  assign the default wireless network to the database at the geographic area during the time window,
wherein the wireless network performance parameters comprise at least one from among a signal strength, call failure statistics, or data performance of the wireless networks.

10. The system of claim 9, wherein the server is further configured to provide access to the database from the plurality of client devices.

11. The system of claim 9, further comprising a requesting client device of the plurality of client devices, and the server, in response to the requesting client device, is configured to:
receive a request for the default wireless network, the request includes location information from the requesting client device and timestamp associated with the request;
searching the database based on the received location information from the requesting client device and the timestamp associated with the request to obtain the default wireless network for a specific geographic area and a specific time window, specific geographic area including a location indicated by the received location information, and the specific time window including a time indicated by the timestamp; and
sending the default wireless network to the requesting client device.

12. The system of claim 11, wherein the requesting client device remains on the default wireless network while the requesting client device remains in the geographic area.

13. The system of claim 12, wherein the requesting client device only switches to a different wireless network if the requesting client device is idle.

14. The system of claim 11, wherein the requesting client device includes a real-time network attach algorithm that selects a different wireless network if the default wireless network is performing poorly.

15. A non-transitory computer readable storage device for providing an overlay network, the computer readable storage device having computer executable instructions for performing the steps of:
receiving, from a plurality of client devices, location information and wireless network performance parameters of wireless networks available to the plurality of client devices;
associating the received location information and the received wireless network performance parameters with a timestamp;
aggregating the received location information, the received wireless network performance parameters and the associated timestamp such that the received wireless network performance parameters are associated with the received location information and the associated timestamp for each of the wireless networks available to the plurality of client devices;

quantizing the wireless network performance parameters to a plurality of geographic areas based on the associated location information and to an at least one time window within each of the plurality of geographic areas, based on the associated timestamp, the at least one time window corresponding to at least one period of time during a day;

analyzing the quantized wireless network performance parameters to determine a default wireless network within each of the plurality of geographic areas and the at least one time window;

building a searchable database based on the plurality of geographic areas and the at least one time window within each of the plurality of geographic areas; and assigning the determined default wireless network within each of the plurality of geographic areas and the at least one time window, wherein the wireless network performance parameters comprise at least one from among a signal strength, call failure statistics, or data performance of the wireless networks.

16. The non-transitory computer readable storage device of claim 15, further comprising instructions for performing the steps of:

receiving a request for the default wireless network within the individual geographic area and the individual time window, the request includes location information from an individual client device and an individual associated timestamp;

searching the database based on the received location information from the individual client device and the individual associated timestamp to obtain the default wireless network within a specific geographic location of the plurality of geographic areas and a specific time window of the at least one time window, the specific geographic area including a location indicated by the location information and the specific time window including a time indicated by the individual associated timestamp; and sending the default wireless network to the individual client device.

17. The non-transitory computer readable storage device of claim 15, further comprising instructions for performing the steps of:

determining primary use locations for each individual client device of the plurality of client devices based on the received location information;

determining a default wireless network for the primary use locations based on the received wireless network performance parameters; and sending the default wireless network for the primary use locations to each individual client device of the plurality of client devices.

18. The non-transitory computer readable storage device of claim 15, wherein the wireless network performance parameters comprise a signal strength of the wireless networks available to the plurality of client devices.

19. The method of claim 1, wherein a first wireless network is determined to be the default wireless network for a first geographic area of the plurality of geographic areas within a first time window of the at least one time window, and a second wireless network is determined to be the default wireless network for the first geographic area during a second time window of the at least one time window.

20. The method of claim 19, further comprising:

receiving a first request for the default wireless network, the first request including first location information indicating a location within the first geographic area from a first individual client device and a first individual associated timestamp indicating a time within the first time window;

searching the database based on the received first location information and the first individual associated timestamp to obtain the default wireless network;

sending the first wireless network to the first individual client device;

receiving a second request for the default wireless network, the second request including second location information indicating a location within the first geographic area from a second individual client device and a second individual associated timestamp indicating a time within the second time window;

searching the database based on the received second location information and the second individual associated timestamp to obtain the default wireless network; and sending the second wireless network to the second individual client device.

* * * * *